United States Patent
Ruan et al.

(10) Patent No.: US 9,215,069 B2
(45) Date of Patent: Dec. 15, 2015

(54) METHODS AND APPARATUS FOR DEVICE AUTHENTICATION WITH ONE-TIME CREDENTIALS

(71) Applicant: Intel Corporation, Santa Clara, CA (US)

(72) Inventors: Xiaoyu Ruan, Folsom, CA (US); Xiaozhu Kang, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 263 days.

(21) Appl. No.: 13/709,646

(22) Filed: Dec. 10, 2012

(65) Prior Publication Data
US 2014/0164767 A1 Jun. 12, 2014

(51) Int. Cl.
*H04K 1/00* (2006.01)
*H04L 9/00* (2006.01)
*H04L 9/28* (2006.01)
*H04L 9/30* (2006.01)
*H04L 9/32* (2006.01)

(52) U.S. Cl.
CPC .............. *H04L 9/32* (2013.01); *H04L 9/3066* (2013.01); *H04L 9/3218* (2013.01)

(58) Field of Classification Search
CPC ... H04L 9/3066; H04L 9/3247; H04L 9/3252; G06F 7/725; H04W 12/06
USPC .............. 380/28, 30; 713/161, 168, 170, 176, 713/180
See application file for complete search history.

(56) References Cited

U.S. PATENT DOCUMENTS

| | | | |
|---|---|---|---|
| 2003/0059042 A1* | 3/2003 | Okeya et al. | 380/30 |
| 2003/0059043 A1* | 3/2003 | Okeya | 380/30 |
| 2004/0010689 A1* | 1/2004 | Vanstone et al. | 713/171 |
| 2006/0153366 A1* | 7/2006 | Beeson | 380/30 |
| 2006/0153367 A1* | 7/2006 | Beeson | 380/30 |
| 2006/0153368 A1* | 7/2006 | Beeson | 380/30 |
| 2006/0165231 A1* | 7/2006 | Srungaram | 380/30 |
| 2006/0212506 A1* | 9/2006 | Vasyltsov | 708/620 |
| 2006/0280296 A1* | 12/2006 | Vasyltsov et al. | 380/28 |
| 2008/0095357 A1* | 4/2008 | Kitamura et al. | 380/28 |
| 2008/0144812 A1* | 6/2008 | Al-Gahtani et al. | 380/30 |
| 2008/0205638 A1* | 8/2008 | Al-Gahtani et al. | 380/30 |
| 2010/0040225 A1* | 2/2010 | Venelli et al. | 380/28 |

OTHER PUBLICATIONS

Wikipedia, "Elliptic curve cryptography", Wikipedia, retrieved on Oct. 10, 2012, 9 pages. Web page available at: http://en.wikipedia.org/wiki/Elliptic_curve_cryptography.

(Continued)

*Primary Examiner* — Tae Kim
(74) *Attorney, Agent, or Firm* — Barre Law Firm, PLLC

(57) ABSTRACT

An automated method for authenticating a proving device to a verifying device involves an elliptic curve formula (ECF) for a predetermined elliptic curve associated with a proving device. According to one example method, the prover sends the verifier a message containing a first proof value (P2). The verifier determines whether P2 is a point on the elliptic curve associated with the proving device. If P2 is not on the elliptic curve, the verifier may determine that the proving device should not be trusted. The message may further comprise a second proof value (K1), and the verifier may automatically determine whether K1 corresponds to P1, based on a previous point (P0) on the elliptic curve. If K1 does not correspond to P1, the verifier may determine that the proving device should not be trusted. Other embodiments are described and claimed.

20 Claims, 3 Drawing Sheets

(56) References Cited

OTHER PUBLICATIONS

Paterson et al., "One-time-password-authenticated key exchange", Cryptology ePrint Archive, Sep. 4, 2009, 15 pages. PDF available at: eprint.iacr.org/2009/430.pdf.

Zhu et al., "Study on an OTP Identity Authentication Scheme in Mobile Commerce", Journal of Computational Information Systems 6:11, Nov. 2010, pp. 3517-3525.

Zhang et al., "Generalized Elliptic Curve Digital Signature Chain Based Authentication and Key Agreement Scheme", Advanced Materials Research vols. 108-111 (2010), Progress in Measurement and Testing, May 11, 2010, pp. 1503-1508. Web page available at: http://www.scientific.net/AMR.108-111.1503.

Brown, Daniel R. L., "SEC 1: Elliptic Curve Cryptography", Standards for Efficient Cryptography, Certicom Research, Certicom Corp., Version 2.0, May 21, 2009, 144 pages.

"SEC 2: Recommended Elliptic Curve Domain Parameters", Standards for Efficient Cryptography, Certicom Research, Certicom Corp., Version 1.0, Sep. 20, 2000, 51 pages.

Wikipedia, "Elliptic curve point multiplication", Wikipedia, retrieved on Nov. 13, 2012, 5 pages. Web page available at: http://en.wikipedia.org/wiki/Elliptic_curve_point_multiplication.

\* cited by examiner

METHODS AND APPARATUS FOR DEVICE AUTHENTICATION WITH ONE-TIME CREDENTIALS

TECHNICAL FIELD

The present disclosure relates in general to data processing systems. More particularly, the present disclosure relates to authentication technology.

BACKGROUND ART

Authentication is the act of confirming the truth of one or more attributes of an entity. The attributes in question may be the identity of a person, the identity of a device, or some other attribute or attributes of the person or device. For instance, to check email managed by an email service provider, a person may supply a userid to specify the persons identity, and a password to prove that the person who is supplying the userid is actually the person to whom the userid belongs. The email service provider may authenticate the identity of the person (or "user") by determining whether the supplied password matches a predefined password for the supplied userid. Such a password may be referred to in general as an authentication factor. For purposes of this disclosure, the entity that is attempting to prove that it is what it claims to be is referred to as the prover, and the entity that is determining whether or not the prover is what it claims to be is called the verifier.

In the field of computer security, at least three different kinds of authentication factors are recognized: possession or ownership factors (involving something the prover has, such as a security token), knowledge factors (involving something the prover knows, such as a password), and inherence factors (involving something the prover is or does, such as a fingerprint or a voice print).

For two-factor authentication, one factor is often a possession factor. A security token distributed under the trademark "RSA SECURID" (or "RSA SecurID"), for example, may provide an authentication code which a user may utilize as a possession factor. Many conventional security tokens use shared secrets between the authentication server and the token to validate the token's identity. Tokens that use shared secrets typically require time synchronization between server and token. Also, if the shared secret is leaked on either side then the authentication is essentially broken.

To avoid using shared secrets, some authentication products employ digital signatures. For example, a token may use a private key to digitally sign a challenge from a server, and the server may then verify the signature using the token's public key. This approach is costly, however, in terms of computing resources, as the token must perform private key operations. This cost may be particularly significant when the token is a small form factor device with very limited computation capability.

BRIEF DESCRIPTION OF THE DRAWINGS

Features and advantages of the present invention will become apparent from the appended claims, the following detailed description of one or more example embodiments, and the corresponding figures, in which:

DESCRIPTION OF THE EMBODIMENTS

The present disclosure describes methods and apparatus for providing strong authentication at low cost. For instance, the features described herein may be used to provide low cost, small form factor devices that are capable of providing strong authentication. Such devices could be used for numerous military and civil applications, such as financial services, medical records, cloud computing, etc. For example, a sensor network in a battle field may consist of thousands of motion sensors spread over a large area, to detect movements of an enemy. This kind of use case would typically require high security and low cost. The teachings of the present disclosure may be used to advantage for this kind of use case. The teachings of the present disclosure may also be used for other types of use cases, with other types of devices or platforms, etc.

In one respect, the present disclosure describes an authentication protocol between two components: a proving device (or "prover") and verifying device (or "verifier"). In one example, a security token, as prover, must prove its identity to the verifier (e.g., an authentication server). Other examples may include many other types of proving devices, including without limitation temperature sensing devices, motion sensing devices, etc.

Furthermore, as described in greater detail below, the present disclosure involves elliptic curve cryptography (ECC). Some important characteristics of an elliptic curve are that, when one point on the curve is added to another point on the curve, the result is necessarily on the curve; and if a first point on the curve is multiplied by a integer value K, the result is a second point on the curve; but if the curve has a significant size (e.g., a 256-bit curve), it is computationally infeasible to derive K, even if the first point, the second point, and the elliptic curve formula are known. In the field of ECC, multiplying a point by 2 is, in effect, the same as adding a point to itself, and multiplying a point by three is, in effect, adding the point to itself, and then adding the point to the result. Multiplication by larger integers can likewise be accomplished by repeated additions. Such multiplication techniques may also be referred to as elliptic curve scalar multiplication.

An elliptic curve may be defined by an elliptic curve formula (ECF). Further details concerning particular ECFs that are suitable for ECC may be found in the Standards for Efficient Cryptography (SEC) document entitled "SEC 2: Recommended Elliptic Curve Domain Parameters," Sep. 20, 2000, Version 1.00 ("SEC 2"). Additional details may be found in "SEC 1: Elliptic Curve Cryptography," Certicom Corp., May 21, 2009, Version 2.0.

Figure 1:
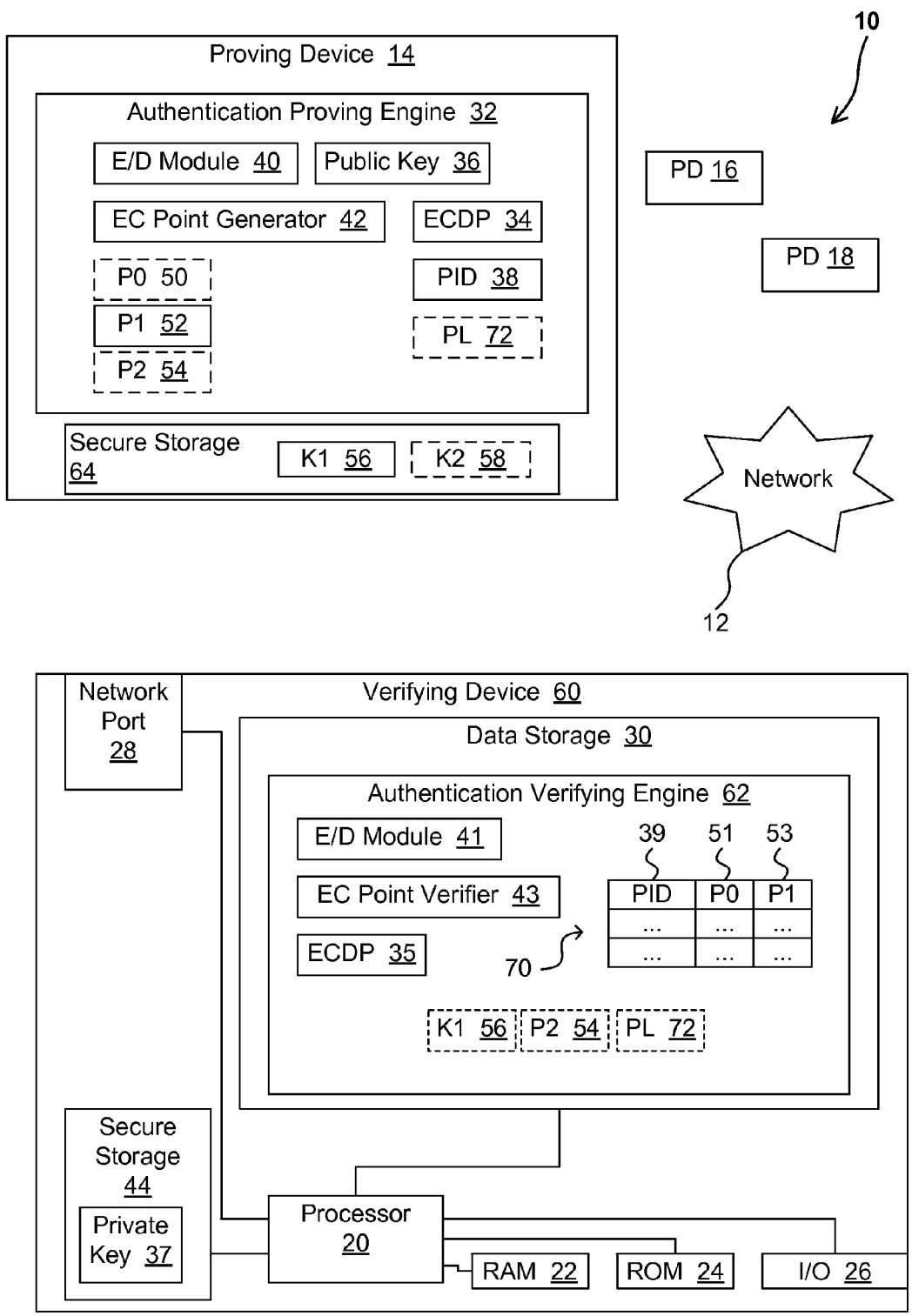
FIG. 1 is a block diagram of an example embodiment of an authentication system involving multiple proving devices and a verifying device.

FIG. 1 is a block diagram of an example embodiment of a data processing system 10 involving multiple proving devices (PD) 14, 16, 18, and a verifying device 60. As used herein, the terms "processing system" and "data processing system" are intended to broadly encompass a single machine, or a system of communicatively coupled machines or devices operating together. For instance, two or more machines may cooperate using one or more variations on a peer-to-peer model, a client/server model, or a cloud computing model to provide some or all of the functionality described herein.

In the embodiment of FIG. 1, the verifying device 60 is a computer server featuring at least one central processing unit (CPU) or processor 20, with random access memory (RAM) 22, read-only memory (ROM) 24, a hard disk drive or other nonvolatile data storage 30, a network port 28, and other input/output (I/O) components 26 (e.g., a monitor) responsive to or coupled to the processor. The processor is also coupled to secure storage 44. The secure storage is nonvolatile storage with integrity protection to store the variables of the prover, and with integrity and confidentiality protection to store the verifying device's private key. In particular, for storing the prover's variables, the secure storage may allow read access to any entity while preventing unauthorized entities from modifying the stored variables of the prover; for storing the verifier's public key, the secure storage prevents unauthorized entities from reading or altering the private key. The secure storage may be implemented as trusted platform module (TPM), for example.

The nonvolatile data storage contains an authentication verification engine 62. The verifying device may copy some or all of the authentication verification engine to RAM when using the authentication verification engine to authenticate proving devices. In other embodiment, the authentication verification engine may run on a desktop, a laptop, or any other suitable type of computer platform. Further details concerning the structure and operation of the authentication verification engine are provided below.

The proving devices may connect to or communicate with the verifying device via one or more networks 12, which may include local area networks (LANs) and/or wide area networks (WANs) (e.g., the Internet). In some example embodiments, the proving devices communicate with the verifying devices via communication technologies including without limitation universal serial bus (USB), near filed communications (NFC), Bluetooth, and/or Transmission Control Protocol/Internet Protocol (TCP/IP).

As illustrated in FIG. 1, the authentication verification engine may include various different components that facilitate authentication of proving devices. For example, the authentication verification engine may include an encryption/decryption (E/D) module 41 and an elliptic curve (EC) point verifier 43. Alternatively, the authentication verification engine may use a decryption module without encryption abilities. For purposes of this disclosure, an E/D module is a module that provides for encryption, for decryption, or for both encryption and decryption. As described in greater detail below, the verifying device may also be provisioned with the elliptic curve domain parameters (ECDPs) 35 for a predetermined elliptic curve associated with one or more proving devices. As illustrated in prover table 70, the verifying device may also be provisioned with a different prover identifier (PID) 39 for each different prover, and with two points for each prover. For reasons explained below, one point may be referred to as the previous point (or "P0") 51, and the other may be referred to as the current point (or "P1") 53.

In one embodiment, the verifying device receives encrypted messages from the proving devices, and the E/D module uses the private key 37 for the verifier to decrypt those messages. Accordingly, the verifying device keeps the private key in the secure storage.

The above-mentioned components of the authentication verification engine are shown in solid lines to indicate that those components are stored in data structures that are relatively permanent. In addition, the authentication verification engine may use various temporary variables to store values that are used for a single authentication determination and then no longer saved or needed by the verifying device. For instance, temporary variables may be used to store a current integer value (K1) 56, a next point (P2) 54, and a payload (PL) 72. Dashed lines are used in FIG. 1 to indicate that those variables/values may be temporary and need not be stored in nonvolatile data storage.

The proving devices may be implemented using the same kinds of computing platforms as described above, with the same kinds of hardware features as the verifying device. Alternatively, one or more of the proving devices may be implemented as a small form factor device that omits or combines some of the hardware features of the verifying device, or otherwise differs from the verifying device. For instance, a proving device may use a less powerful processor and a smaller RAM than a verifying device. Also, instead of using ROM and another nonvolatile storage device, a proving device may use only a single nonvolatile storage device (such as flash memory). In the embodiment of FIG. 1, the proving devices also include secure storage 64. This secure storage is nonvolatile storage with integrity and confidentiality protection. In other words, the secure storage allows an authorized program (e.g., the authentication proving engine) to read and write data, while preventing unauthorized entities from reading or altering the data. The secure storage may be implemented as TPM or as a customized design such as using one or more random fuses as keys for integrity and confidentiality of data on flash memory, for example.

However, the proving device has an authentication proving engine 32, which may be stored in flash memory, for example, and loaded into RAM for execution. In the embodiment of FIG. 1, the authentication proving engine includes an E/D module 40, a public key 36 that corresponds to the private key of the verifying device, an EC point generator 42, ECDPs 34, a PID 38, and a current point (P1) 52. Alternatively, instead of using an encryption/decryption module, a proving device may use an encryption module without decryption abilities. The authentication proving engine may also keep a current integer value (K1) 56 in secure storage. As illustrated with dashed lines, at certain times the authentication proving engine may also use various temporary variables, such as a previous point (P0) 50, a next point (P2) 54, a next integer value (K2) 58, and a payload (PL) 72. The other proving devices (e.g., PDs 16 & 18) may include the same kinds of control logic and data structures as shown for proving device 14, but with content such as the PIDs, the P1s, the K1s, etc. tailored to each proving device.

In the embodiment of FIG. 1, the same EC and ECDPs are used for all proving devices. In alternative embodiments, different ECs may be used for different proving devices, and the verifying device may use a table like table 70, but with an extra column for ECDPs, to associate each proving device with its corresponding ECF.

The ECF may be defined by an equation substantially of the form $y^2 = x^3 + ax + b$. For example, in one embodiment, the elliptic curve to be used by the proving device and the verifying device is defined by a sextuple T of elliptic curve domain parameters over $F_p$, where:

$$T = (p, a, b, G, n, h)$$

consisting of an integer p specifying the finite field $F_p$;

two elements a, b that are elements of the finite field $F_p$ specifying an elliptic curve $E(F_p)$ defined by the equation:

$$y^2 = x^3 + ax + b \pmod{p};$$

a base point $G = (xG, yG)$ on $E(F_p)$;

a prime n which is the order of G; and an integer h which is the cofactor $h = \#E(F_p)/n$.

In particular, for a 256-bit curve for instance, the verifying device and the proving devices may save the ECDPs specified in Section 2.7.1 or 2.7.2 of SEC 2. As described in greater detail below, the verifying device and the proving devices may also save a base point. In one embodiment, the verifying device and the proving devices may use the base point specified in Section 2.7.1 or 2.7.2 of SEC 2.

In one embodiment, some or all of the authentication verification engine is written in the C/C++ programming language, and some or all the authentication verification engine runs on top of a more or less conventional OS on a server computer. In other embodiments, other types of programming languages and operating environments may be used. Also, in one embodiment, some or all of the authentication proving engine is written in the C/C++ programming language, and some or all the authentication proving engine runs on top of a more or less conventional OS (e.g., a real-time OS (RTOS)) on a small form factor platform such as sensing devices. In other embodiments, other types of programming languages and operating environments may be used.

Figure 2:
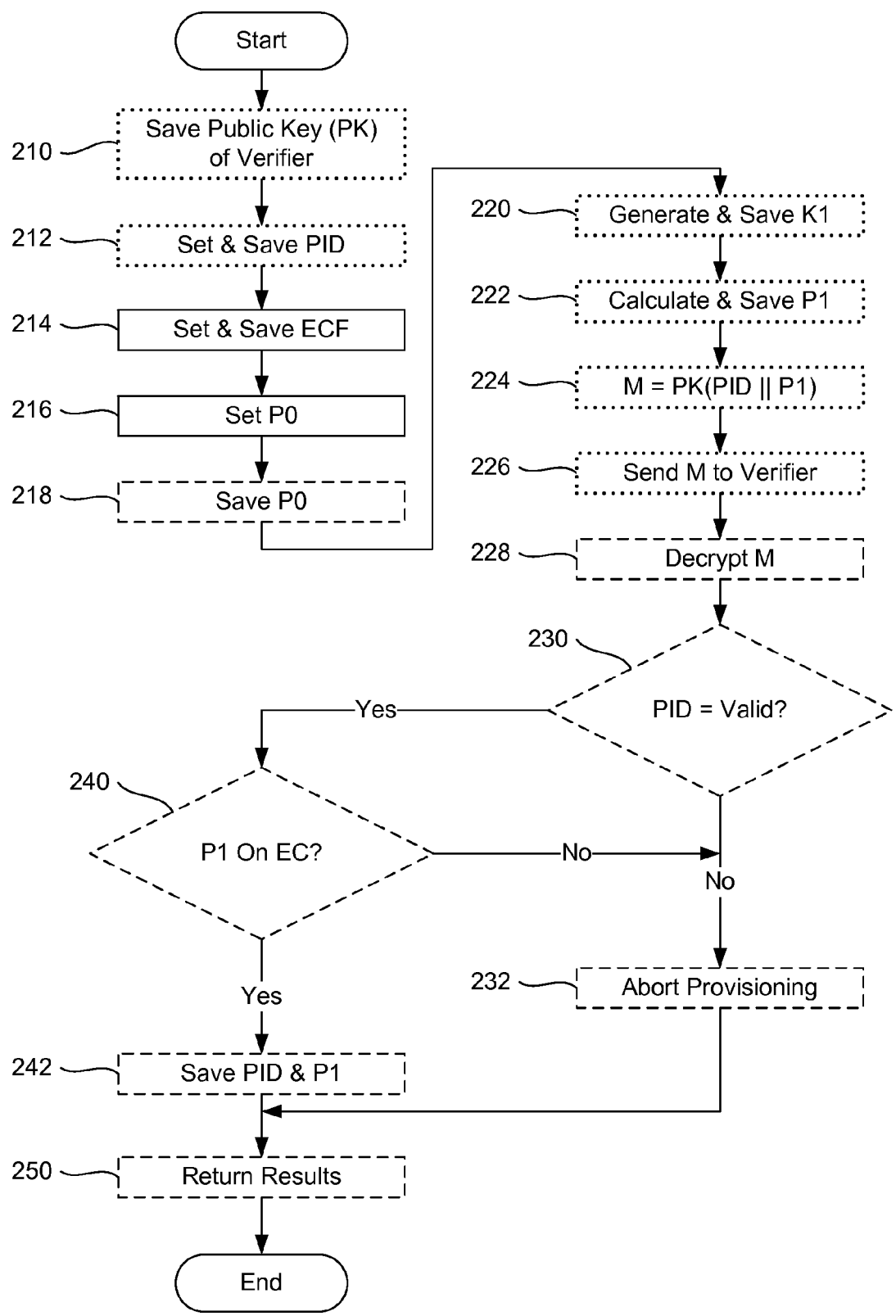
FIG. 2 presents a flowchart of an example embodiment of a process for provisioning a proving device and a verifying device for authentication.

FIG. 2 presents a flowchart of an example embodiment of a process for provisioning a proving device and a verifying device for authentication. The provisioning process establishes the relationship between the prover and the verifier. It usually happens during the manufacturing process of the prover. There is no secret transfer between prover and verifier during provisioning. The only security requirement on the provisioning environment is protection from man-in-the middle attached (e.g., the messages between the prover and verifier during provisioning must not be intercepted or replaced by a man-in-the-middle attacker). This protection is easily provided in an isolated environment such as on a manufacturing floor.

Figure 3:
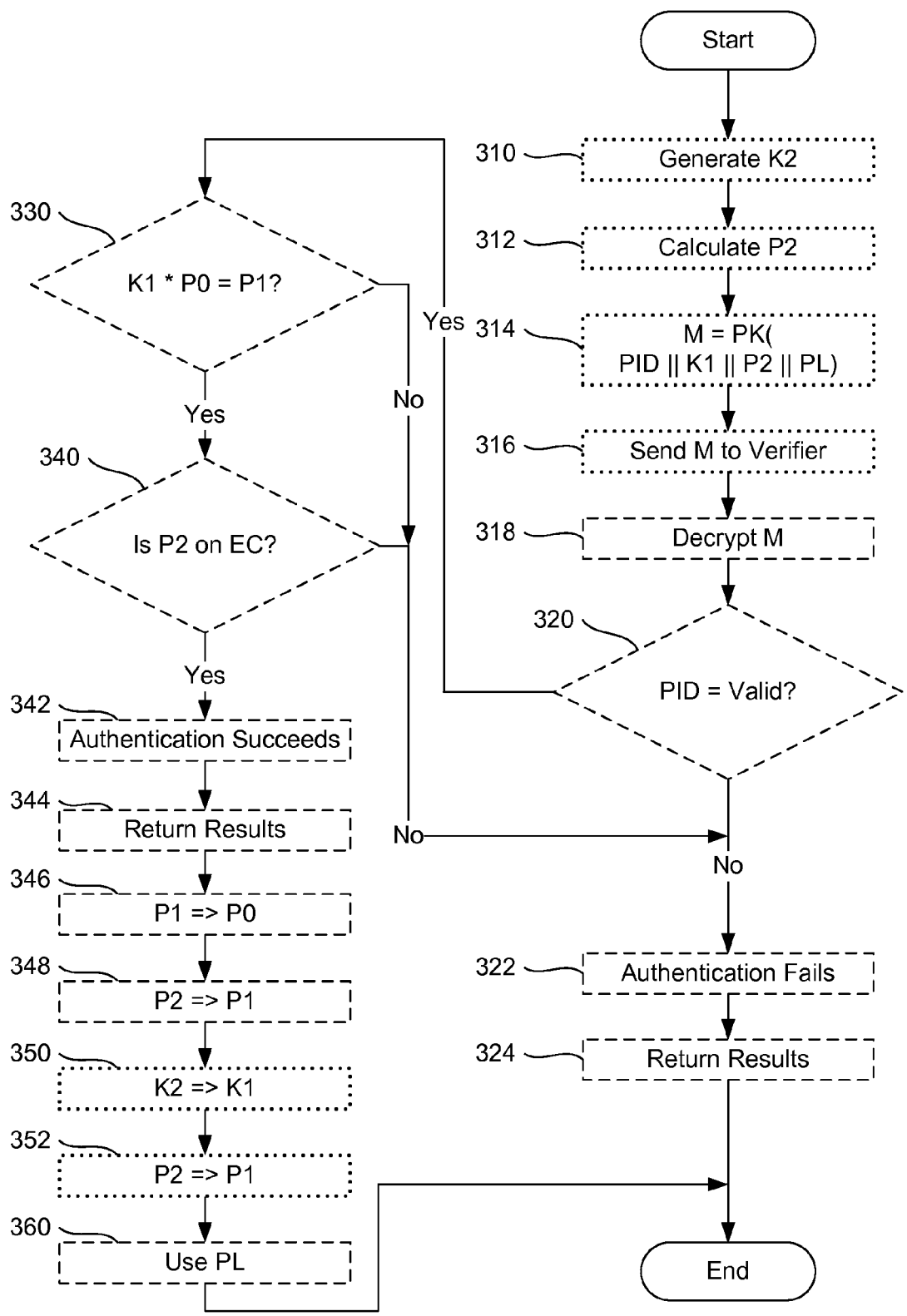
FIG. 3 presents a flowchart of an example embodiment of a process for authenticating a proving device.

In FIGS. 2 and 3, solid lines are used for the blocks which represent operations that are performed by both the proving device and the verifying device, dotted lines are used for operations that are performed by the proving device, and dashed lines are used for operations that are performed by the verifying device.

The process of FIG. 2 may start after the authentication proving engine has been loaded onto the proving device and the authentication verification engine has been loaded onto the verifying device. As show at block 210, the verifying device may then save the public key (PK) of the verifying device. In addition, the proving device may select or generate a PID for itself and save that PID, as shown at block 212. The proving device may select a substantially random PID, for example. Alternatively, the verifying device may assign a PID to the proving device. In the embodiment of FIG. 2, each proving device gets a unique PID. Also, the verifying device may define specific criteria of a valid PID.

The proving device and the verifying device may then cooperate to set and save the ECDPs, as shown at block 214. For instance, if the verifying device is configured to use the same elliptic curve for all proving devices, the verifying device may simply send the ECDPs for that elliptic curve to the proving device. Consequently, the verifying device may associate the same elliptic curve with all proving device. In other embodiments, other techniques may be used to set the elliptic curve, and some proving devices may use different elliptic curves, in which case the verifying device will associate different ECDPs with different proving devices.

As shown at block 216, the proving device and the verifying device also agree on a particular point on the predetermined elliptic curve to serve as the initial point or base point. For example, the verifying device may instruct the proving device to use the base point that is recommended by SEC 2 for the selected elliptic curve, as indicated above. During provisioning, the verifying device and the proving device may each use a P0 variable to store the base point. For example, as indicated at block 218, the verifying device may save the value for the base point in prover table 70. P0 need not be treated as a secret.

As shown at block 220, the authentication proving engine may then generate and save a substantially random big integer K1, with the size of K1 equal to the size of the curve chosen. For example, if a 256-bit curve is used, then K1 is 256 bits. Furthermore, K1 is a secret. Consequently, the authentication proving engine saves K1 in secure storage.

As depicted at block 222, the authentication proving engine then uses K1 to calculate and save another point on the curve. That calculated point may be referred to for present purposes as P1. The proving device may perform scalar multiplication on the chosen elliptic curve to calculate P1=K1*P0. Thus, P1 will be a point on the curve. P1 need not be treated as a secret.

For purposes of this disclosure, each big integer that is used as a factor for scalar multiplication to generate a point on the elliptic curve may be referred to as an elliptic curve point factor or simply a point factor.

As indicated at block 224, the authentication proving engine then uses its E/D module to create an encrypted message (M), using the public key of the verifying device. The encrypted message includes P1 and the PID of the proving device. For purposes of this disclosure, PK(ID||P1) denotes the ciphertext of plaintext data encrypted with public key PK, and || denotes concatenation. The authentication proving engine then sends M to the verifying device, as shown at block 226.

As shown at block 228, the authentication verification engine then uses its E/D module and the private key of the verifying device to decrypt M. As shown at block 230, the authentication verification engine may then determine whether the PID is valid, particularly if the proving device generated its own PID. If the PID does not meet the predetermined criteria required by the authentication verification engine, the authentication verification engine may abort the provisioning process, as shown at block 232. However, if the PID is valid, the authentication verification engine may then use the EC point verifier to determine whether P1 is on the selected elliptic curve, as indicated at block 240. If P1 is not on the curve, the authentication verification engine may abort the process, as indicated at block 232. However, if P1 is on the curve, the authentication verification engine may save the PID and P1 in the prover table, as shown at block 242. Also, if P0 has not already been saved, the authentication verification engine may also save P0 with the PID and P1. The authentication verification engine may then send a message to the authentication proving engine indicating whether or not provisioning was completed successfully, as shown at block 250, and the process may then end.

Consequently, after successful provision, to proving device holds values for K1 and P1, and the verifying device holds values for PID, P0, and P1. For purposes of provision, P0 may be referred to as the base point, K1 may be referred to as the current integer value or current integer factor, and P1 may be referred to as the current point. Subsequently, during the process of authentication, some or all of those values may serve slightly different purposes, and may be referred to with different names. In particular, P0 may be referred to as the previous point. In addition, as described in greater detail below, the authentication proving engine may generate a new big integer K2 (which may be referred to as the new integer factor, the next integer factor, or simply the next factor), and a new point P2 (which may be referred to as the next point).

FIG. 3 presents a flowchart of an example embodiment of a process for authenticating a proving device. Typically, the authentication process will be used after the proving device has been provisioned and deployed into the field. The process of FIG. 3 depicts the operations associated with the first authentication after provisioning, along with comments explaining how the same approach may be used for each subsequent (or more generally for the $n^{th}$ authentication).

To start the authentication process, the authentication proving engine may generate a substantially random new big integer factor K2, where K2 is also the same size as the chosen curve. As indicated above, K2 may be referred to as the next factor (or more generally as $K_{n+1}$) and the authentication proving engine may use K2 (or $K_{n+1}$) to generate a new point P2 (or $P_{n+1}$) on the elliptic curve, as shown at blocks 310 and 312. For instance, the authentication proving engine may calculate P2=K2*P1 (or more generally, $P_{n+1}=K_{n+1}*P_n$). As with P1, this calculation uses scalar multiplication on the chosen elliptic curve. As indicated above, P2 may also be referred to as the next point.

The authentication proving engine may then concatenate the PID for the proving device, the current factor K1, and the next point P2 into a plaintext message, and the authentication verification engine may use its E/D module and the public key of the verifying device to encrypt that message, as shown at block 314. In addition, the authentication verification engine may also include a payload PL in that plaintext message before encrypting the plaintext message. For instance, when the proving device includes motion sensors, the payload may indicate whether or not motion has been sensed. As shown at block 316, the authentication verification engine then sends M to the verifying device.

As indicated at block 318, the authentication verification engine then uses its E/D module and the private key for the verifying device to decrypt M. As shown at block 320, the authentication verification engine may then determine whether the PID is valid. If the PID is not valid (e.g., if the PID is not in the prover table), the authentication verification engine may conclude that authentication has failed and may return results to the proving device indicating that authentication has failed, as indicated at blocks 322 and 324.

However, if the PID is valid, the authentication verification engine may use the previously stored values for P0 and P1 (in other words, the previous point and the current point) to determine whether the K1 value that was sent by the proving device actually results in P1 equaling P0*K1 (or more generally, whether $P_n=K_n*P_{n-1}$). Thus, the authentication verification engine determines whether the proving device has supplied (or "knows") the integer factor that was used to calculate P1. And since the authentication protocol requires the proving device to keep K1 secret, the ability to provide K1 serves as good evidence that the proving device truly is the device that it purports to be. If K1*P0 does not equal P1, the authentication verification engine may conclude that authentication has failed and may return corresponding results to the proving device, as indicated at blocks 322 and 324.

If K1*P0 does equal P1, the authentication verification engine may then determine whether P2 is on the elliptic curve, as shown at block 340. In other words, the authentication verification engine will use the ECDPs and the x and y values from P2 to determine whether P2 satisfies the ECF. If P2 is not on the elliptic curve, the authentication verification engine may conclude that authentication has failed and may return corresponding results to the proving device, as indicated at blocks 322 and 324.

If P2 is on the elliptic curve, the authentication verification engine may conclude that authentication is successful and the proving device should be trusted, and the verifying device may return corresponding results to the proving device, as indicated at blocks 342 and 344. The authentication verification engine may then move the value from P1 to P0, as shown at block 346. And the authentication verification engine may move the value from P2 to P1, as shown at block 348. In other words, upon successful authentication, what started as the next point becomes the current point, and what started as the current point becomes the previous point. Also, as shown at blocks 350 and 352, in response to receiving confirmation of authentication from the verifying device, the authentication proving engine moves the value from K2 to K1 and the value from P2 to P1. In other words, what started as the next integer factor becomes the current integer factor, and what started as the next point becomes the current point.

In addition, as shown at block 360, after successful authentication, the verifying device may use the payload that was provided by the proving device. For instance, if the proving device is serving as a motion detector, the verifying device may trust and use the payload information from the proving device indicating whether or not movement was detected.

Thus, the proving device sends its PID, K1, and P2 to the verifying device to prove that the proving device should be trusted (i.e., is authentic). The verifying device then proceeds to use those values to determine whether the proving device should be trusted. Consequently, the PID, K1, and P2 values or parameters that are sent to the verifying device may be called proof values.

Unlike many conventional approaches to authentication, at least one embodiment of the process described herein provides authentication without using any secrets shared between the proving device and the verifying device. In particular, according to one, the only necessary secret between authentication processes is the current integer factor K1, and the only necessary secret during the authentication process is the next integer factor K2. Between authentication processes, the proving device protects K1 in secure storage and does not share K1 with the verifying device. And during the authentication process, the proving device only shares K1 after K2 has been generated, and if authentication succeeds, the proving device immediately replaces K1 with K2.

Also unlike many conventional approaches, at least one embodiment of the process described herein provides authentication without using time synchronization between the proving device and the verifying device. In addition, according to at least one embodiment of the process described herein, proving devices need not use digital signatures. For instance, proving devices need not digitally sign challenges from the verifying device. Consequently, proving devices need not perform compute intensive private key operations, and the calculation overhead of the proving device is small. Even though the protocol described herein involves asymmetric-key cryptography, the prover is only required to perform public key operations, which only consume approximately ten percent of the computational resource required for a private key operation.

Moreover, according to at least one embodiment described herein, the authentication credentials change after every authentication. The integer value that is generated by the proving device, used by the authentication proving engine to compute a next point, and saved in protected storage is such a credential. Furthermore, after the proving device generates a new integer value and discloses the previous integer value to the verifying device, the new integer value becomes such a credential. Once disclosed by the proving device, the previous integer value is not considered secret anymore. Thus, credentials may be used only one time. Consequently, replay attacks may be mitigated or prevented.

Additionally, the nonvolatile storage requirements for the proving device and the verifying device are very small. According to at least one embodiment, the proving device is only required to store one elliptic curve point (P1), one random number (K1), and the verifier's public key. The total size of the point and the random number combined can be as small as ninety-six bytes if a 256-bit curve is used; and the point and the random number can still provide the security strength recommended by the National Institute of Standards and Technology (NIST). Similarly, according to at least one embodiment, the verifying device is only required to store its keypair and two elliptic curve points. The total size of the two points combined can be as small as 128 bytes if a 256-bit curve is used. Also, the size of the points in the proving device and the verifying device can be further reduced by utilizing well-known elliptic curve point compression techniques.

Furthermore, the protocol provides for a simple provisioning flow, possibly involving only one message sent from prover to verifier. No multi-way handshakes are required. According to at least one embodiment, the provisioning process requires an isolated environment (to prevent man-in-the middle attacks) but it does not require a secure environment. In other words, even if an attacker were to snoop all communications between the verifying device and the proving device during provisioning, the attacker would not obtain enough information to successfully impersonate the proving device for subsequent authentication.

According to at least one embodiment, the authentication flow is also simple, possibly involving only one message sent from the proving device to the verifying device. No multi-way handshakes are required.

In addition, the authentication data (P0 and P1) stored on the verifying device changes after every authentication. The protocol is therefore more secure than protocols which use a static password or key. And the values of P0 and P1 are not secret. Also, if desired, a small payload may be transmitted from prover to verifier securely as part of the authentication.

In light of the principles and example embodiments described and illustrated herein, it will be recognized that the illustrated embodiments can be modified in arrangement and detail without departing from such principles. Also, the foregoing discussion has focused on particular embodiments, but other configurations are contemplated. Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

Any suitable operating environment and programming language (or combination of operating environments and programming languages) may be used to implement components described herein. As indicated above, the present teachings may be used to advantage in many different kinds of data processing systems. Example data processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, handheld devices, entertainment devices such as audio devices, video devices, audio/video devices (e.g., televisions and set top boxes), vehicular processing systems, and other devices for processing or transmitting information. Accordingly, unless explicitly specified otherwise or required by the context, references to any particular type of data processing system (e.g., a server) should be understood as encompassing other types of data processing systems, as well. Also, unless expressly specified otherwise, components that are described as being coupled to each other, in communication with each other, responsive to each other, or the like need not be in continuous communication with each other and need not be directly coupled to each other. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, application-specific integrated circuits (ASICs), embedded computers, smart cards, and the like. For purposes of this disclosure, the term "bus" includes pathways that may be shared by more than two devices, as well as point-to-point pathways.

This disclosure may refer to instructions, functions, procedures, data structures, application programs, configuration settings, and other kinds of data. As described above, when the data is accessed by a machine, the machine may respond by performing tasks, defining abstract data types or low-level hardware contexts, and/or performing other operations. For instance, data storage, RAM, and/or flash memory may include various sets of instructions which, when executed, perform various operations. Such sets of instructions may be referred to in general as software. In addition, the term "program" may be used in general to cover a broad range of software constructs, including applications, routines, modules, drivers, subprograms, processes, and other types of software components. Also, applications and/or other data that are described above as residing on a particular device in one example embodiment may, in other embodiments, reside on one or more other devices. And computing operations that are described above as being performed on one particular device in one example embodiment may, in other embodiments, be executed by one or more other devices.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. For example, alternative embodiments include machine accessible media encoding instructions or control logic for performing the operations of the invention. Such embodiments may also be referred to as program products. Such machine accessible media may include, without limitation, tangible storage media such as magnetic disks, optical disks, RAM, read only memory (ROM), etc. For purposes of this disclosure, the term "ROM" may be used in general to refer to non-volatile memory devices such as erasable programmable ROM (EPROM), electrically erasable programmable ROM (EEPROM), flash ROM, flash memory, etc. In some embodiments, some or all of the control logic for implementing the described operations may be implemented in hardware logic (e.g., as part of an integrated circuit chip, a programmable gate array (PGA), an ASIC, etc.). In at least one embodiment, the instructions for all components may be stored in one non-transitory machine accessible medium. In at least one other embodiment, two or more non-transitory machine accessible media may be used for storing the instructions for the components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of the invention. Instead, the scope of the invention is intended to cover many different embodiments, including without limitation embodiments with the features described in the following paragraphs.

(A1) An automated method for authenticating a proving device to a verifying device involves an elliptic curve formula (ECF) for a predetermined elliptic curve that is associated with the proving device. According to the method the verifying device receives a message from the proving device, wherein the message comprises a proof value. The verifying device automatically determines whether the proof value from the proving device is on a predetermined elliptic curve associated with the proving device, based at least in part on the ECF. The verifying device automatically determines whether the proving device should be trusted, based at least in part on the determination of whether the proof value from the proving device is on the predetermined elliptic curve associated with the proving device.

(A2) In a method according to paragraph A1, the proof value comprises a first proof value and the message further comprises a second proof value. The method further comprises automatically determining whether the second proof value corresponds to a predetermined current point on the predetermined elliptic curve, based at least in part on the ECF and on a predetermined previous point on the predetermined elliptic curve that is associated with the proving device. The operation of automatically determining whether the proving device should be trusted is based at least in part on (i) the determination of whether the first proof value is on the predetermined elliptic curve and (ii) the determination of whether the second proof value corresponds to the predetermined current point on the predetermined elliptic curve.

(A3) In a method according to paragraph A2, the second proof value may be denoted by K1, the predetermined current point may be denoted by P1, and the predetermined previous point may be denoted by P0. Also, the operation of automatically determining whether the second proof value corresponds to the predetermined current point on the predetermined elliptic curve comprises automatically determining whether K1*P0=P1, wherein * denotes scalar multiplication on the predetermined elliptic curve.

(A4) In a method according to paragraph A1, the first proof value may be denoted by P2, and the operation of automatically determining whether the first proof value is on the predetermined elliptic curve comprises automatically determining whether P2 satisfies the ECF.

(A5) In a method according to paragraph A4, the ECF comprises an a value and a b value for an equation substantially of the form $y^2=x^3+ax+b$; and the first proof value (P2) comprises an x value and a y value.

(A6) In a method according to paragraph A1, the message from the proving device further comprises a payload; and the method further comprises using the payload in response to a determination that the proving device should be trusted.

(A7) In a method according to paragraph A1, the message from the proving device comprises an encrypted message; and the method further comprises using a private key of the verifying device to decrypt the encrypted message from the proving device.

(A8) In a method according to paragraph A1, the message from the proving device further comprises a prover identifier. Also, the method further comprises automatically determining whether the prover identifier is valid; and automatically determining whether the proving device should be trusted, based at least in part on the determination of whether the prover identifier is valid.

(A9) In a method according to paragraph A1, the method further comprises, before receiving the message with the first proof value from the proving device, provisioning the verifying device by using an identifier for the proving device to associate a previous point on the predetermined elliptic curve and a current point on the predetermined elliptic curve with the proving device.

(A10) In a method according to paragraph A9, the method further comprises, after receiving the message with the first proof value from the proving device, using the identifier for the proving device to retrieve the previous point and the current point.

(B1) Another automated method for authenticating a proving device to a verifying device involves an elliptic curve formula (ECF) for a predetermined elliptic curve that is associated with the proving device. According to this method, the proving device automatically generates a new point on the predetermined elliptic curve, based at least in part on the ECF and on a predetermined current point on the predetermined elliptic curve. The proving device sends an authentication message to the verifying device, wherein the message comprises the new point. The processing system realizes a positive authentication determination in response to sending, to the verifying device, the authentication message with the new point on the predetermined elliptic curve.

(B2) In a method according to paragraph B1, the method further comprises automatically generating an integer factor; and the operation of automatically generating the new point on the predetermined elliptic curve is based at least in part on the ECF, the predetermined current point, and the integer factor.

(B3) In a method according to paragraph B2, the integer factor comprises a new integer factor. Also, the method further comprises, before generating the new integer factor, generating a current integer factor; and before generating the new point, computing another point on the predetermined elliptic curve to serve as the predetermined current point, wherein the predetermined current point is based on the current integer factor, the ECF, and a predetermined previous point on the predetermined elliptic curve. The method also comprises, before sending the message with the new point to the verifying device, provisioning the verifying device with the predetermined previous point on the predetermined elliptic curve and with the predetermined current point on the predetermined elliptic curve. The method also comprises including the current integer factor in the authentication message, and saving the new integer factor in protected storage.

(B4) In a method according to paragraph B3, for the new integer factor may be denoted by K2 and the predetermined current point may be denoted by P1. Also, the operation of automatically generating the new point (P2) on the predetermined elliptic curve comprises calculating the new point (P2) as K2*P1, wherein * denotes scalar multiplication on the predetermined elliptic curve.

(C) Furthermore, the features of paragraph A1 may be combined with the features described in any one or more of paragraphs A2 through A10 and B1 through B4. Also, the features of paragraph B1 may be combined with the features described in any one or more of paragraphs A1 through A10 and B2 through B4.

(D) At least one machine accessible medium comprises technology for authenticating a proving device to a verifying device. The machine accessible medium comprises instructions which, when executed by a data processing system, cause the data processing system to perform the operations (or combination of operations) described in any of paragraphs A1 through A10, B1 through B4, and C.

(E) A data processing system comprises technology for authenticating a proving device to a verifying device. The data processing system comprises a processor and at least one machine accessible medium responsive to the processor. The machine accessible medium comprises instructions which, when executed by the data processing system, cause the data processing system to perform the operations (or combination of operations) described in any of paragraphs A1 through A10, B1 through B4, and C.

(F1) A data processing system comprises a processing element, at least one machine accessible medium responsive to the processing element, and an authentication verification engine stored at least partially in the at least one machine accessible medium. The authentication verification engine is operable to receive a message from a proving device, wherein the message comprises a proof value. The authentication verification engine is configured to automatically determine whether the proof value from the proving device is on a predetermined elliptic curve associated with the proving device, based at least in part on an elliptic curve formula (ECF) for the predetermined elliptic curve. The authentication verification engine is also configured to automatically determine whether the proving device should be trusted, based at least in part on the determination of whether the proof value from the proving device is on the predetermined elliptic curve associated with the proving device.

(F2) In a data processing system according to paragraph F1, the authentication verification engine is also configured to enable the data processing system to perform the operations (or combination of operations) described in any of paragraphs A2 through A10, B1 through B4, and C.

(G) For purposes of establishing initial parameters to guide examination of the present application—and without disclaiming, for purposes of rights to be secured with subsequent applications or with further prosecution of the present application, embodiments that may depart in some degree from these initial parameters—what is claimed are all implementations that come within the scope of the claims set forth in the "Claims" section, and all equivalents to such implementations.

What is claimed is:

1. At least one non-transitory machine accessible medium comprising computer instructions for authenticating a proving device, wherein the computer instructions, in response to being executed on a data processing system, enable the data processing system to operate as a verifying device to perform a method comprising:

receiving an authentication message from a proving device, wherein the authentication message comprises a proof value and a current integer factor (K1), and wherein the proof value comprises a new point (P2) on a predetermined elliptic curve associated with the proving device;

before receiving the authentication message from the proving device, receiving, from the proving device, a previous point (P0) on the predetermined elliptic curve and a current point (P1) on the predetermined elliptic curve;

automatically determining whether the proof value from the proving device is on the predetermined elliptic curve associated with the proving device, based at least in part on an elliptic curve formula (ECF) for the predetermined elliptic curve;

after receiving the authentication message from the proving device, using P0 and P1 from the proving device to automatically determine whether K1*P0=P1, wherein * denotes scalar multiplication on the predetermined elliptic curve; and automatically determining whether the proving device should be trusted, based at least in part on the determination of whether the proof value from the proving device is on the predetermined elliptic curve associated with the proving device, and based at least in part on the determination of whether K1*P0=P1.

2. At least one machine accessible medium comprising computer instructions according to claim 1, wherein the operation of automatically determining whether the proof value is on the predetermined elliptic curve comprises:

automatically determining whether the proof value satisfies the ECF.

3. At least one machine accessible medium comprising computer instructions according to claim 2, wherein:

the ECF comprises an a value and a b value for an equation substantially of the form $y^2=x^3+ax+b$; and the proof value comprises an x value and a y value.

4. At least one machine accessible medium comprising computer instructions according to claim 1, wherein:

the authentication message from the proving device further comprises a payload; and the method further comprises using the payload in response to a determination that the proving device should be trusted.

5. At least one machine accessible medium comprising computer instructions according to claim 1, wherein:

the authentication message from the proving device comprises an encrypted message; and the method further comprises using a private key of the verifying device to decrypt the encrypted message from the proving device.

6. At least one machine accessible medium comprising computer instructions according to claim 1, wherein:

the authentication message from the proving device further comprises a prover identifier; and the method further comprises:

automatically determining whether the prover identifier is valid; and automatically determining whether the proving device should be trusted, based at least in part on the determination of whether the prover identifier is valid.

7. At least one machine accessible medium comprising computer instructions according to claim 1, wherein the method further comprises:

before receiving the authentication message with the proof value from the proving device, provisioning the verifying device by using an identifier for the proving device to associate P0 and P1 with the proving device.

8. At least one machine accessible medium comprising computer instructions according to claim 7, wherein the method further comprises:
after receiving the authentication message with the proof value from the proving device, using the identifier for the proving device to retrieve the previous point and the current point.

9. A data processing system comprising:
a processing element;
at least one non-transitory machine accessible medium responsive to the processing element; and
an authentication verification engine stored at least partially in the at least one machine accessible medium, wherein the authentication verification engine is configured to perform operations comprising:
receiving an authentication message from a proving device, wherein the authentication message comprises a proof value and a current integer factor (K1), and wherein the proof value comprises a new point (P2) on a predetermined elliptic curve associated with the proving device;
before receiving the authentication message from the proving device, receiving, from the proving device, a previous point (P0) on the predetermined elliptic curve and a current point (P1) on the predetermined elliptic curve;
automatically determining whether the proof value from the proving device is on the predetermined elliptic curve associated with the proving device, based at least in part on an elliptic curve formula (ECF) for the predetermined elliptic curve;
after receiving the authentication message from the proving device, using P0 and P1 from the proving device to automatically determine whether K1*P0=P1, wherein * denotes scalar multiplication on the predetermined elliptic curve; and
automatically determining whether the proving device should be trusted, based at least in part on the determination of whether the proof value from the proving device is on the predetermined elliptic curve associated with the proving device, and based at least in part on the determination of whether K1*P0=P1.

10. A data processing system according to claim 9 wherein:
the ECF comprises an a value and a b value for an equation substantially of the form $y^2=x^3+ax+b$;
the proof value comprises an x value and a y value; and
the operation of automatically determining whether the proof value is on the predetermined elliptic curve comprises automatically determining whether the proof value satisfies the ECF.

11. A data processing system according to claim 9, wherein:
the authentication message from the proving device further comprises a payload; and
the data processing system is configured to use the payload in response to a determination that the proving device should be trusted.

12. An automated method for authenticating a proving device to a verifying device, the method comprising:
at a verifying device, receiving an authentication message from the proving device, wherein the authentication message comprises a proof value and a current integer factor (K1), and wherein the proof value comprises a new point (P2) on a predetermined elliptic curve associated with the proving device;
before receiving the authentication message from the proving device, receiving, from the proving device, a previous point (P0) on the predetermined elliptic curve and a current point (P1) on the predetermined elliptic curve;
automatically determining whether the proof value is on the predetermined elliptic curve associated with the proving device, based at least in part on an elliptic curve formula (ECF) for the predetermined elliptic curve;
after receiving the authentication message from the proving device, using P0 and P1 from the proving device to automatically determine whether K1*P0=P1, wherein * denotes scalar multiplication on the predetermined elliptic curve; and
automatically determining whether the proving device should be trusted, based at least in part on the determination of whether the proof value is on the predetermined elliptic curve, and based at least in part on the determination of whether K1*P0=P1.

13. A method according to claim 12 wherein:
the ECF comprises an a value and a b value for an equation substantially of the form $y^2=x^3+ax+b$;
the proof value comprises an x value and a y value; and
the operation of automatically determining whether the proof value is on the predetermined elliptic curve comprises automatically determining whether the proof value satisfies the ECF.

14. A method according to claim 12, wherein:
the authentication message from the proving device further comprises a payload; and
the method further comprises using the payload in response to a determination that the proving device should be trusted.

15. A method according to claim 12, further comprising:
before receiving the authentication message with the proof value from the proving device, provisioning the verifying device by using an identifier for the proving device to associate P0 and P1 with the proving device.

16. A method according to claim 15, further comprising:
after receiving the authentication message with the proof value from the proving device, using the identifier for the proving device to retrieve P0 and P1.

17. At least one non-transitory machine accessible medium comprising computer instructions for authenticating a proving device, wherein the computer instructions, in response to being executed on a data processing system, enable the data processing system to operate as a proving device to perform a method comprising:
automatically generating a new integer factor (K2);
before generating K2, generating K1, wherein K1 comprises a current integer factor;
automatically generating a new point (P2) on a predetermined elliptic curve, based at least in part on an elliptic curve formula (ECF) for the predetermined elliptic curve, on a predetermined current point (P1) on the predetermined elliptic curve, and on K2;
before generating P2, computing P1, wherein P1 is based on K1, on the ECF, and on a predetermined previous point (P0) on the predetermined elliptic curve; and
sending, to a verifying device, an authentication message that comprises (a) P2 and (b) an integer factor (K1) that was used by the proving device to perform a scalar multiplication operation on the predetermined elliptic curve;

before sending the authentication message with P2 and K1 to the verifying device, provisioning the verifying device with P1; and realizing a positive authentication determination in response to sending, to the verifying device, the authentication message with P2 and K1.

18. At least one machine accessible medium comprising computer instructions according to claim 17, wherein the operation of automatically generating P2 comprises calculating P2 as K2*P1, wherein * denotes scalar multiplication on the predetermined elliptic curve.

19. At least one machine accessible medium comprising computer instructions according to claim 17, further comprising:

before sending the authentication message with P2 and K1 to the verifying device, provisioning the verifying device with P0.

20. At least one machine accessible medium comprising computer instructions according to claim 17, further comprising:

after generating K2, saving K2 in protected storage.

* * * * *